(12) United States Patent
Yang et al.

(10) Patent No.: US 11,481,547 B2
(45) Date of Patent: Oct. 25, 2022

(54) FRAMEWORK FOR CHINESE TEXT ERROR IDENTIFICATION AND CORRECTION

(71) Applicant: TENCENT AMERICA LLC, Palo Alto, CA (US)

(72) Inventors: Tao Yang, Mountain View, CA (US); Zeyu You, San Jose, CA (US); Min Tu, Cupertino, CA (US); Shangqing Zhang, San Jose, CA (US); Xu Wang, Palo Alto, CA (US); Lianyi Han, Palo Alto, CA (US); Wei Fan, New York, NY (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/142,718

(22) Filed: Jan. 6, 2021

(65) Prior Publication Data
US 2022/0215170 A1     Jul. 7, 2022

(51) Int. Cl.
*G06F 40/53*     (2020.01)
*G06F 40/129*    (2020.01)
*G06F 40/232*    (2020.01)
*G06F 40/274*    (2020.01)

(52) U.S. Cl.
CPC .......... *G06F 40/232* (2020.01); *G06F 40/129* (2020.01); *G06F 40/274* (2020.01); *G06F 40/53* (2020.01)

(58) Field of Classification Search
None
See application file for complete search history.

(56) References Cited

U.S. PATENT DOCUMENTS 4,937,745 A * 6/1990 Carmon .................. G06F 3/018
715/264
5,360,343 A * 11/1994 Tang .......................... B41J 3/01
341/22

(Continued)

FOREIGN PATENT DOCUMENTS

CN      1484173 A    *  3/2004
CN    108009253 A    *  5/2018  ....... G06F 16/90344

(Continued)

OTHER PUBLICATIONS

King, Levi et al. "Leveraging Known Semantics for Spelling Correction". Nov. 2014, LiU Electronic Press. <https://www.aclweb.org/anthology/W14-3504.pdf> (Year: 2014).*

(Continued)

*Primary Examiner* — Andrew R Dyer
*Assistant Examiner* — Tyler Schallhorn
(74) *Attorney, Agent, or Firm* — Sughrue Mion, PLLC

(57) ABSTRACT

A method, computer program, and computer system is provided for text error identification and correction. A text input having a phonetic component and a glyphic component is received. Information corresponding to the phonetic component and the glyphic component is coded as a fixed-length sequence. One or more candidate replacement words corresponding to the fixed-length sequence are identified. At least a portion of the text input is replaced with a candidate replacement word from among the one or more candidate replacement words.

14 Claims, 6 Drawing Sheets

(56) References Cited

U.S. PATENT DOCUMENTS

| | | | | |
|---|---|---|---|---|
| 8,725,497 | B2* | 5/2014 | Wang | G06F 40/232 |
| | | | | 704/9 |
| 8,909,516 | B2* | 12/2014 | Medero | G06F 40/237 |
| | | | | 704/9 |
| 9,047,268 | B2* | 6/2015 | Ouyang | G06F 40/274 |
| 9,442,909 | B2* | 9/2016 | Bhatt | G06F 40/157 |
| 9,465,783 | B2* | 10/2016 | Bhatt | G06F 40/157 |
| 10,402,490 | B1* | 9/2019 | Benavides | G06F 40/166 |
| 11,080,492 | B2* | 8/2021 | Deng | G06F 40/289 |
| 11,106,690 | B1* | 8/2021 | Dhillon | G06N 7/005 |
| 2013/0090916 | A1* | 4/2013 | Wang | G06F 40/232 |
| | | | | 704/9 |
| 2013/0110497 | A1* | 5/2013 | Medero | G06F 40/237 |
| | | | | 704/9 |
| 2014/0108923 | A1* | 4/2014 | Bhatt | G06F 40/157 |
| | | | | 715/271 |
| 2014/0108924 | A1* | 4/2014 | Bhatt | G06F 40/157 |
| | | | | 715/271 |
| 2014/0214405 | A1* | 7/2014 | Ouyang | G06F 3/04886 |
| | | | | 704/9 |
| 2016/0239470 | A1* | 8/2016 | Zhang | G06F 40/242 |
| 2017/0364486 | A1* | 12/2017 | Zhou | G06F 3/018 |
| 2019/0370393 | A1* | 12/2019 | Finch | G06F 40/274 |
| 2020/0192983 | A1* | 6/2020 | Deng | G06F 40/289 |

FOREIGN PATENT DOCUMENTS

| | | | | |
|---|---|---|---|---|
| CN | 112287100 A | * | 1/2021 | |
| WO | WO-2015014287 A1 | * | 2/2015 | ......... G06F 17/2863 |

OTHER PUBLICATIONS

"Chinese string similarity algorithm based on phonetic code" [with English machine translation], Nov. 14, 2014, Chinese Software Developer Network, https://blog.csdn.net/chndata/article/details/41114771> (Year: 2014).*

Wang, Hanru et al. "Chinese Text Error Correction Suggestion Generation Based on SoundShape Code". Jan. 4, 2020, Springer, <https://doi.org/10.1007/978-3-030-38189-9_44> (Year: 2020).*

Xu, Senlin et al. "String Comparators for Chinese-Characters-Based Record Linkages". Dec. 29, 2020, IEEE. <https://ieeexplore.ieee.org/document/9310262> (Year: 2020).*

Zhou, Hao et al. "Chinese sensitive words detection algorithm based on improved sound-character code", Journal of Nanjing University (Natural Science), vol. 56 No. 2, Mar. 2020. (pp. 270-277) <https://jns.nju.edu.en/CN/10.13232/j.cnki.jnju.2020.02.013> (Year: 2020).*

* cited by examiner

FRAMEWORK FOR CHINESE TEXT ERROR IDENTIFICATION AND CORRECTION

FIELD

This disclosure relates generally to field of data processing, and more particularly to natural language processing.

BACKGROUND

Unlike many other languages like English, the Chinese writing system is based on logograms and its characters do not represent phonemes directly. In other words, people recognize and understand the meaning of a text in Chinese through the glyph features of Chinese characters. On the other hand, Pinyin, a phonetic-based system for Chinese romanization, has also been developed and widely used in everyday life.

Chinese input methods may fall into one of two categories: phonetic readings or root shapes. Methods under the phonetic category such as Pinyin, Latin characters are collected directly from a user's input via a physical or a virtual keyboard, and thus typing errors could be introduced during the typing process. After typing, the user has to select the glyphic correct ones from a list of phonetically similar characters.

SUMMARY

Embodiments relate to a method, system, and computer readable medium for text error identification and correction. According to one aspect, a method for text error identification and correction is provided. The method may include receiving a text input having a phonetic component and a glyphic component. Information corresponding to the phonetic component and the glyphic component is coded as a fixed-length sequence. One or more candidate replacement words corresponding to the fixed-length sequence are identified. At least a portion of the text input is replaced with a candidate replacement word from among the one or more candidate replacement words.

According to another aspect, a computer system for text error identification and correction is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving a text input having a phonetic component and a glyphic component. Information corresponding to the phonetic component and the glyphic component is coded as a fixed-length sequence. One or more candidate replacement words corresponding to the fixed-length sequence are identified. At least a portion of the text input is replaced with a candidate replacement word from among the one or more candidate replacement words.

According to yet another aspect, a computer readable medium for text error identification and correction is provided. The computer readable medium may include one or more computer-readable storage devices and program instructions stored on at least one of the one or more tangible storage devices, the program instructions executable by a processor. The program instructions are executable by a processor for performing a method that may accordingly include receiving a text input having a phonetic component and a glyphic component. Information corresponding to the phonetic component and the glyphic component is coded as a fixed-length sequence. One or more candidate replacement words corresponding to the fixed-length sequence are identified. At least a portion of the text input is replaced with a candidate replacement word from among the one or more candidate replacement words.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings.

DETAILED DESCRIPTION

Figure 1:
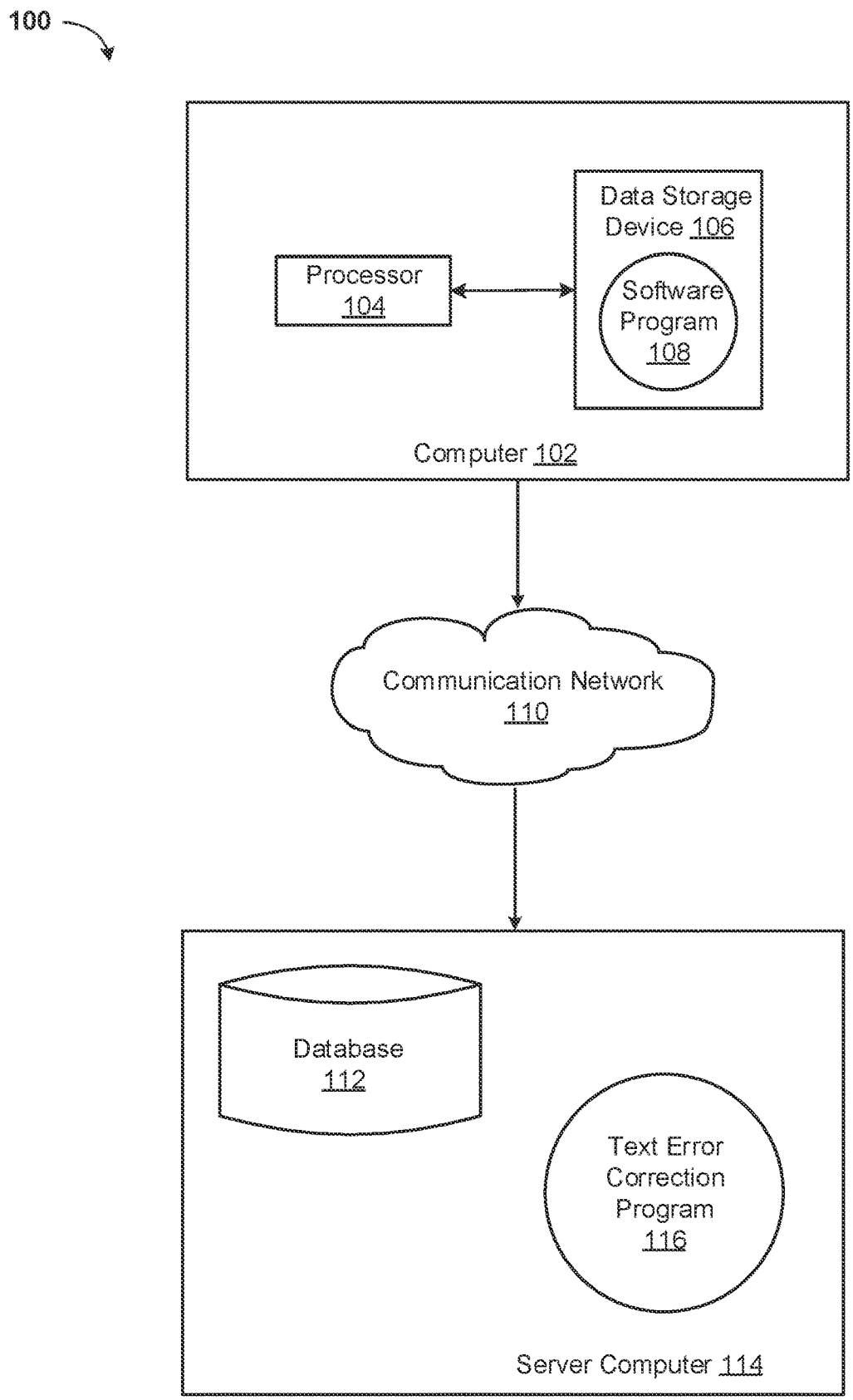
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

As previously described, Chinese input methods may fall into one of two categories: phonetic readings or root shapes. Methods under the phonetic category such as Pinyin, Latin characters are collected directly from a user's input via a physical or a virtual keyboard, and thus typing errors could be introduced during the typing process. After typing, the user has to select the glyphic correct ones from a list of phonetically similar characters.

However, input errors, such as use of an incorrect homophone, are quite common to be introduced either intentionally (e.g., confusing use of a term) or unintentionally. In addition, text inputs converted through an automated speech recognition (ASR) system will suffer the aforementioned drawbacks as well; as internally, those systems usually utilize Pinyin features (e.g., characters; initials, finals, and tones) during their learning and predicting processes. Methods under the root shape category such as handwriting recognition and Wubi, are also popular but have a difficult learning curve, as there are thousands of common Chinese characters in everyday use and a user needs a thorough understanding of a character's strokes and composition. Consequently, input errors are often introduced intentionally with a misunderstanding or confusion of usage, or unintentionally due to glyphic confusion. Systemic bias is another common source of input errors, as a language model in an AI system is built based on some general or domain-specific corpus (where the distributions could be different).

It may be advantageous, therefore, to use a framework for Chinese text error identification and correction in which an encoding schema for processing Chinese characters is capable of taking full advantage of the phonetic and glyphic features within a character. A flexible similarity calculation method is also introduced together with the encoding strategy.

Aspects are described herein with reference to flowchart illustrations and/or block diagrams of methods, apparatus (systems), and computer readable media according to the various embodiments. It will be understood that each block of the flowchart illustrations and/or block diagrams, and combinations of blocks in the flowchart illustrations and/or block diagrams, can be implemented by computer readable program instructions.

The following described exemplary embodiments provide a system, method and computer program that identifies and replaces text errors in natural language processing applications. Referring now to FIG. 1, a functional block diagram of a networked computer environment illustrating a text error identification and correction system 100 (hereinafter "system") for ident. It should be appreciated that FIG. 1 provides only an illustration of one implementation and does not imply any limitations with regard to the environments in which different embodiments may be implemented. Many modifications to the depicted environments may be made based on design and implementation requirements.

The system 100 may include a computer 102 and a server computer 114. The computer 102 may communicate with the server computer 114 via a communication network 110 (hereinafter "network"). The computer 102 may include a processor 104 and a software program 108 that is stored on a data storage device 106 and is enabled to interface with a user and communicate with the server computer 114. As will be discussed below with reference to FIG. 4 the computer 102 may include internal components 800A and external components 900A, respectively, and the server computer 114 may include internal components 800B and external components 900B, respectively. The computer 102 may be, for example, a mobile device, a telephone, a personal digital assistant, a netbook, a laptop computer, a tablet computer, a desktop computer, or any type of computing devices capable of running a program, accessing a network, and accessing a database.

The server computer 114 may also operate in a cloud computing service model, such as Software as a Service (SaaS), Platform as a Service (PaaS), or Infrastructure as a Service (IaaS), as discussed below with respect to FIGS. 5 and 6. The server computer 114 may also be located in a cloud computing deployment model, such as a private cloud, community cloud, public cloud, or hybrid cloud.

The server computer 114, which may be used for text error identification and correction is enabled to run a Text Error Correction Program 116 (hereinafter "program") that may interact with a database 112. The Text Error Correction Program method is explained in more detail below with respect to FIG. 3. In one embodiment, the computer 102 may operate as an input device including a user interface while the program 116 may run primarily on server computer 114. In an alternative embodiment, the program 116 may run primarily on one or more computers 102 while the server computer 114 may be used for processing and storage of data used by the program 116. It should be noted that the program 116 may be a standalone program or may be integrated into a larger text error correction program.

It should be noted, however, that processing for the program 116 may, in some instances be shared amongst the computers 102 and the server computers 114 in any ratio. In another embodiment, the program 116 may operate on more than one computer, server computer, or some combination of computers and server computers, for example, a plurality of computers 102 communicating across the network 110 with a single server computer 114. In another embodiment, for example, the program 116 may operate on a plurality of server computers 114 communicating across the network 110 with a plurality of client computers. Alternatively, the program may operate on a network server communicating across the network with a server and a plurality of client computers.

The network 110 may include wired connections, wireless connections, fiber optic connections, or some combination thereof. In general, the network 110 can be any combination of connections and protocols that will support communications between the computer 102 and the server computer 114. The network 110 may include various types of networks, such as, for example, a local area network (LAN), a wide area network (WAN) such as the Internet, a telecommunication network such as the Public Switched Telephone Network (PSTN), a wireless network, a public switched network, a satellite network, a cellular network (e.g., a fifth generation (5G) network, a long-term evolution (LTE) network, a third generation (3G) network, a code division multiple access (CDMA) network, etc.), a public land mobile network (PLMN), a metropolitan area network (MAN), a private network, an ad hoc network, an intranet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of system 100 may perform one or more functions described as being performed by another set of devices of system 100.

Figure 2:
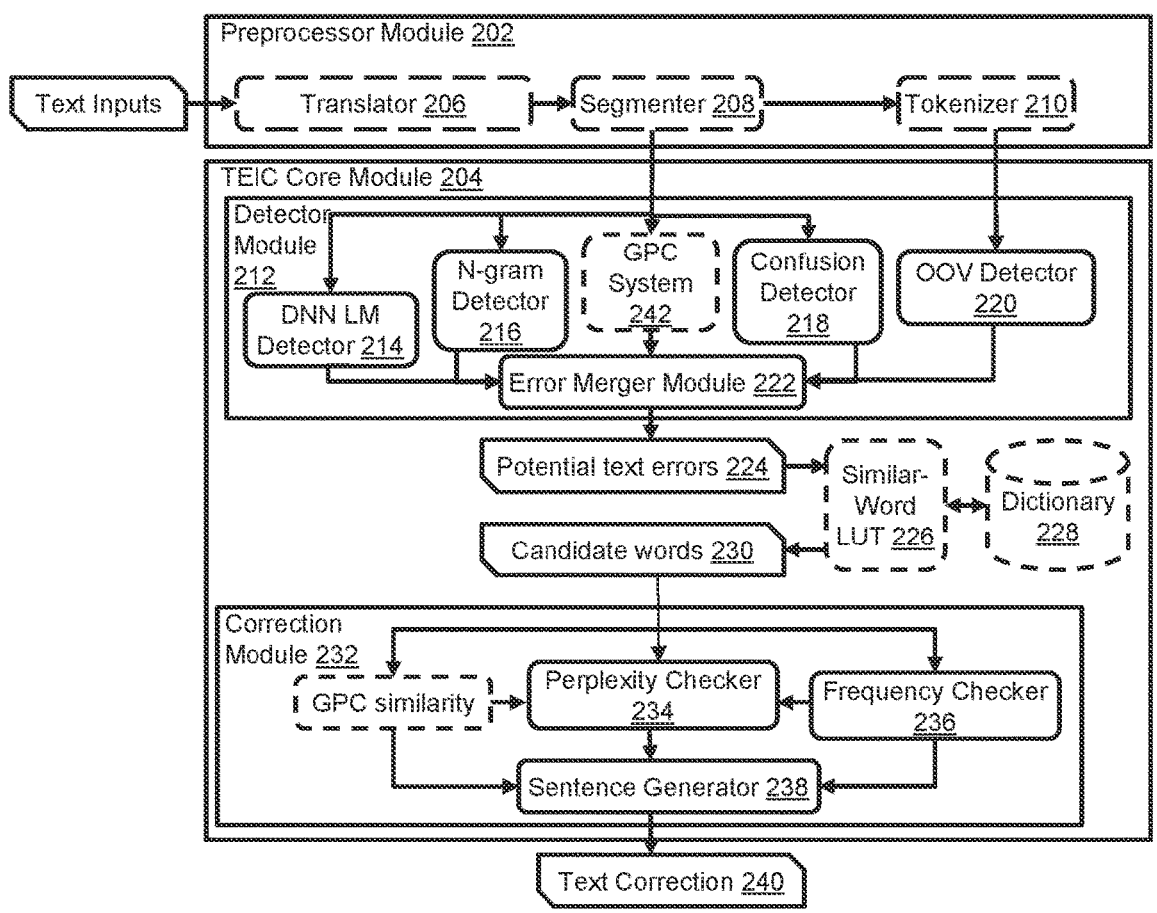
FIG. 2 is a block diagram of a system for text error identification and correction, according to at least one embodiment.

Referring now to FIG. 2, a practical a system block diagram of a text error identification and correction (TEIC) framework 200 is depicted. The TEIC framework 200 may include a preprocessor module 202 and a TEIC core module 204. The preprocessor module 202 may include a translator 206 to convert between the simplified Chinese (CHS) and the traditional Chinese (CHT) characters, a segmenter 208 to split a long complex sentence into short simple sub-sentence, and a tokenizer 210 to divide a character-level sequence into a word-level sequence.

In the TEIC core, a detector module 212 may integrate a set of detectors to discover potential text errors. Specifically, a deep neural network language model (DNN-LM) detector 214 is based on a deep neural language model, the n-gram detector 216 calculates potential error positions based on a statistical language model, a confusion detector 218 simply finds target pre-defined word within the given sequence, an Out-of-Vocabulary (OOV) detector 220 also based on a statistical language model but on the word-level. An error merger module 222 is added then to deal with duplicate and overlapping detection results. After collecting all potential text errors 224 from the detector module 212, the system queries all glyphically and/or phonetically candidate words 230 from a similar-word lookup table 226 that may access the dictionary 228. In a correction module 232, a corrector uses a certain distance metric to check through all the candidates, ranks them, and then picks the one with the best score or probability. In natural language processing (NLP), perplexity is a way of evaluating language models, and theoretically, a sentence with a lower perplexity score is better. In TEIC, the perplexity checker 234 can be used individually or served as a post verification step for other similarity checkers, such as a frequency checker 236. A sentence generator 238 will run a final checking process and then decide whether or not to accept such a text correction 240.

According to one or more embodiments, a glyphic and phonetic coding (GPC) system 242 may be used in the TEIC framework 200 to rank candidate words by the similarities calculated based on their GPC codes. To further optimize the system performance, the GPC codes of the most frequently used Chinese characters may be pre-calculated, rather than obtain the codes at runtime. The GPC system 242 can be further used to build up similar-word lookup tables to link glyphically and phonetically similar words, as supplements to the traditional manually-built confusion dictionary and the similar-word dictionary. In addition, The GPC system 242 can be integrated into the detector module 212. One application may include domain adaptation. For example, words and terms used in the healthcare domain or legal domain could be quite different from ordinary daily-used terms. As a result, domain-specific terms could be incorrectly inputted, or converted by an AI processing model (e.g., ASR, handwriting recognition). With a given domain-specific dictionary, the system may first compare the input with the ordinary daily-used terms, and build a lookup table to link glyphically and phonetically similar words. If such an ordinary frequently used word appears in an input sequence, it could be a potential error that can be verified in the later correction stage. A dynamic detection algorithm may be used to check whether there exists a potential match (unnecessary to be an exact match) with a target domain-specific word. For example, a modified Knuth-Morris-Pratt (KMP) string-searching algorithm may be used, where a match (in KMP algorithm) is calculated based on the GPC codes between two characters. In practice, a threshold may be used to relax the matching standard, e.g., considering two codes a match if $s(C_1,C_2) \geq 0.8$.

The GPC system 242 may use a glyphic and phonetic coding system 1 to process Chinese characters. It is a flexible encoding system consisting of two major parts: the glyphic codes and the phonetic codes, respectively. A key idea to employ a consistent mapping system for each kind of features of the characters. Since Chinese characters are generally logograms, each character can be decomposed into a series of basic strokes. For encoding and easy comparing purposes, a fixed-length coding system may be employed to characterize glyphic features. A character may be encoded based on its four-corner code, structure code, and the number of strokes. More specifically, Positions "g0" to "g4" represent the four-corner code (Wikipedia). The system uses five numerical digits per character to represent a Chinese character. The first four digits encode the shapes found in the four corners of the symbol, top-left to bottom-right. The fifth digit describes an extra part above the bottom-right if necessary;

Position "g5" encodes the structure information of a character. The structure is a way to split a character into several (typically two or three) basic components. Besides the non-separable structure, there are about 12 basic Chinese character structures, including ⿰, ⿱, ⿲, ⿳, ⿴, ⿵, ⿶, ⿷, ⿸, ⿹, ⿺, ⿻, known as the ideographic description characters;

Position "g6" records the number of strokes information, i.e., how many basic Chinese strokes are needed to write a Chinese character.

In addition to the glyphic features of a character, the phonetic features in the GPC system may be encoded. There are several solutions to transcribe all possible sounds in Mandarin, including Pinyin—an official romanization system for Standard Chinese in mainland China, and Bopomofo—one most commonly used in Taiwanese Mandarin. For using the Pinyin system, position "p0" encodes the initials (声母) information, as there are 21 possible symbols in the standard solution; position "p1" encodes the finals (韵母) information, as there are 24 possible symbols in the standard solution; position "p2" is an auxiliary to the finals, to encode possible additional finals in a complex case; and position "p3" encodes the tones information, using the five-level tone markers. It may be appreciated that the phonetic features should be extracted at, at least, the word-level, as the heteronym problems of Chinese can produce wrong conversions while processing every single character individually. It may be further appreciated that a code in a position can represent a series of categorical situations, for example, using digits 0~9, together with letters a-z, A-Z, or even other character encodings (e.g., using UTF-8).

With the feature engineering module introduced above, a Chinese character may be converted into a set of fixed-length codes. The codes may be used to directly describe the similarity between the two characters. However, alternatively, additional prior knowledge may be introduced from the glyphic and phonetic perspectives through a customized mapping schema.

A four-corner method may use the original four-corner codes to compare, since this method itself already takes in glyphic similarity into consideration. A structure code may assign a unique code for each kind of structure to distinguish from the others as shown in Table 1 below. The code may also be based on a number of strokes as shown in Table 2 below.

TABLE 1

Structure feature mapping schema.

| structure | ⿰ | ⿱ | ⿲ | ⿳ | ⿴ | ⿵ | ⿶ | ⿷ | ⿸ | ⿹ | ⿺ | ⿻ | ⿻ |
|---|---|---|---|---|---|---|---|---|---|---|---|---|---|
| code | 0 | 1 | 2 | 3 | 4 | 5 | 6 | 7 | 8 | 9 | 10 | 11 | 12 |

TABLE 2

Stroke feature mapping schema.

| # of strokes | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| code | 0 | 1 | 2 | 3 | 4 | 5 | 6 | 7 | 8 | 9 | A | B | C | D | E | F | G | H |
| # of strokes | 19 | 20 | 21 | 22 | 23 | 24 | 25 | 26 | 27 | 28 | 29 | 30 | 31 | 32 | 33 | 34 | 35 | 36+ |
| code | I | J | K | L | M | N | O | P | Q | R | S | T | U | V | W | X | Y | Z |

It may be appreciated that the number of strokes of those most frequently used simplified Chinese characters is less than 30. As a result, in practice, a single code may be used to represent those extremely large numbers. Traditional Chinese characters may be converted to simplified Chinese characters. Alternatively, lowercase letters a-z may be used to code large numbers of strokes, or a data structure may be used to store the entire set of character features and then simply record this information by an integer variable.

Pinyin codes may use the original characters or a fuzzy mapping schema to reduce the distances of a number of similar-sounding syllables of pinyin. For example, the inputs "ci" and "chi" as an example, their initials are "c" and "ch" respectively. For example, the same code may be set for "c" and "ch", as regional accents are prevalent in Mandarin among both native and nonnative speakers. Some example coding schemas are as follows:

TABLE 3

Pinyin-Initials mapping schema.

| Initial | b | p | m | f | d | t | n | l | g | k | h | j | q | x | z | c | s | r | zh | ch | sh |
|---|---|---|---|---|---|---|---|---|---|---|---|---|---|---|---|---|---|---|---|---|---|
| code | A | B | C | D | E | F | G | H | I | J | K | L | M | N | O | P | Q | R | S | T | U |
| code_a1 | A | B | C | D | E | F | G | H | I | J | K | L | M | N | O | P | Q | R | O | P | Q |

TABLE 4

Pinyin-Finals mapping schema.

| final | a | o | e | i | u | ü | | | |
|---|---|---|---|---|---|---|---|---|---|
| code | A | B | C | D | E | F | | | |
| final | ai | ei | ui | ao | ou | iu | ie | üe | er |
| code | G | H | I | J | K | L | M | N | 0 |
| final | an | en | in | un | ün | ang | eng | Ing | ong |
| code | P | Q | R | S | T | U | V | W | X |
| code_a1 | P | Q | R | S | T | P | Q | R | X |

TABLE 5

Pinyin-Tones mapping schema.

| | Tone | | | | |
|---|---|---|---|---|---|
| | neutral | flat | rising | falling-rising | Falling |
| code | 0 | 1 | 2 | 3 | 4 |

In Tables 3 and 4, "code_a1" shows a way of fuzzy Pinyin solution, however, fuzzy rules such as "n"="ng", "h"="f", "n"="l" may be added. Alternatively, two initials may be coded separately but may employ a predefined lookup table of pairwise distance to quantify such a partially matching scenario. Table 5 shows a code that may be used for inflections associated with tones of Pinyin characters.

Note: in modern Pinyin standard, there are in total 39 finals, where the additional ones can be considered as a combination of certain ones from those 24 basic finals. For example, "黄"-->Pinyin-->"huáng", is decomposed as "h", "u", "ang" and tone-2, then, it's Pinyin feature can be coded as "K, U, E, 2". ("u" is the auxiliary final)

For example, by combining all the character features and applying those aforementioned coding schemas, "腾讯" may be converted to "79227 1 C FV02" and "37710 1 5 NS04".

For each type of character feature, there are basically two ways to measure its distance—binary measurement and continuous measurement. The binary measurement simply checks whether two codes are the same or not and returns "1" or "0", respectively. In the proposed GPC system, codes extracted from the four-corner method, the structure of the character, and Pinyin, can use such a binary way to quantify the distance, as a difference in such a code, typically demonstrates a completely different among a certain perspective between the candidates.

The continuous measurement is suitable for the scenario when a code difference does not imply critical or direct character differences. In our case, the difference over the number of strokes can be measured in a proportionate way.

Formally, let $f(.,.)$ denote a binary measurement function, where for two codes a and b, $f(a,b)=1$ if $a=b$, and $f(a,b)=0$ otherwise. Let $h(.,.)$ denote a continuous measurement function, for two codes a and b.

For a complete comparison between two Chinese characters under the proposed GPC system, each part of the feature similarity may be aggregated together through a weighted function. Formally, let $G=[g_0, \ldots, g_6]$ denote the set of glyphic features, and $P=[p_0, \ldots, p_3]$ denote the set of phonetic features of a character, a GPC code may be represented as $C=[G,P]$. Then the similarity between two characters $C_1$ and $C_2$, $S(C_1, C_2)$ can be calculated as:

$$s(C_1, C_2) = W_G D_G(G_1, G_2) + W_P D_P(P_1, P_2)$$

$$= \sum_{i=0}^{5} w_{gi} f(g_{1i}, g_{2i}) + w_{g6} h(g_{16}, g_{26}) + \sum_{i=0}^{3} w_{pi} f(P_{1i}, P_{2i})$$

where $W=[W_G, W_P]=[w_{g0}, \ldots, w_{g6}, w_{p0}, \ldots, w_{p3}]$, and, $\Sigma_i w_i=1$, $0 \leq w_i \leq 1$, for $w_i$ in W.

Note that the value ranges of functions $h(.,.)$ and $s(C_1, C_2)$ are all $[0,1]$, and the higher, the more similar. In practice, W is a set of tunable weighting variables that control the impacts of each type of features of a Chinese character. More specifically, weights $w_{g0} \sim w_{g4}$ affect similarity impacts of the four-corner method, a reasonable setting is $w_{g0}=w_{g1}=w_{g2}=w_{g3} \geq w_{g4}$, as the last code in four-corner method is an extra structure code; $w_{g5}$ affects the similarity impact of the structure; $w_{g5}$ affects the similarity impact of the number of strokes; $w_{p0}$~$w_{p3}$ affect the similarity impacts of Pinyin system, a recommended setting is $w_{p0} \geq w_{p1} \geq w_{p2} \geq w_{p3}$.

According to one or more embodiments, in addition to the aforementioned four-corner system, some other coding systems could also be suitable for the TEIC task. Alternatives include the telegraph code, the CKC method, the Zhengma method, the Wubi method, and the stroke count method. It may be appreciated that the length of a converted code of a character may be the same or close at least. For example, with Wubi, any Chinese can be represented based on at most four codes, and thus we can align any character to the max length. It may be further appreciated that similarities can be properly measured through the coding system. Some counterexamples such as Big5 and GBK may not be suitable, since characters may not be close to each other when their codes are close.

According to one or more embodiments, besides the Pinyin system, the Bopomofo method is an alternative solution. In addition, it is worth mentioning that we can use different styles of phonetic annotations, for example, only considering the first initial letter, only keeping the finals part, or ignoring the tones.

Figure 3:
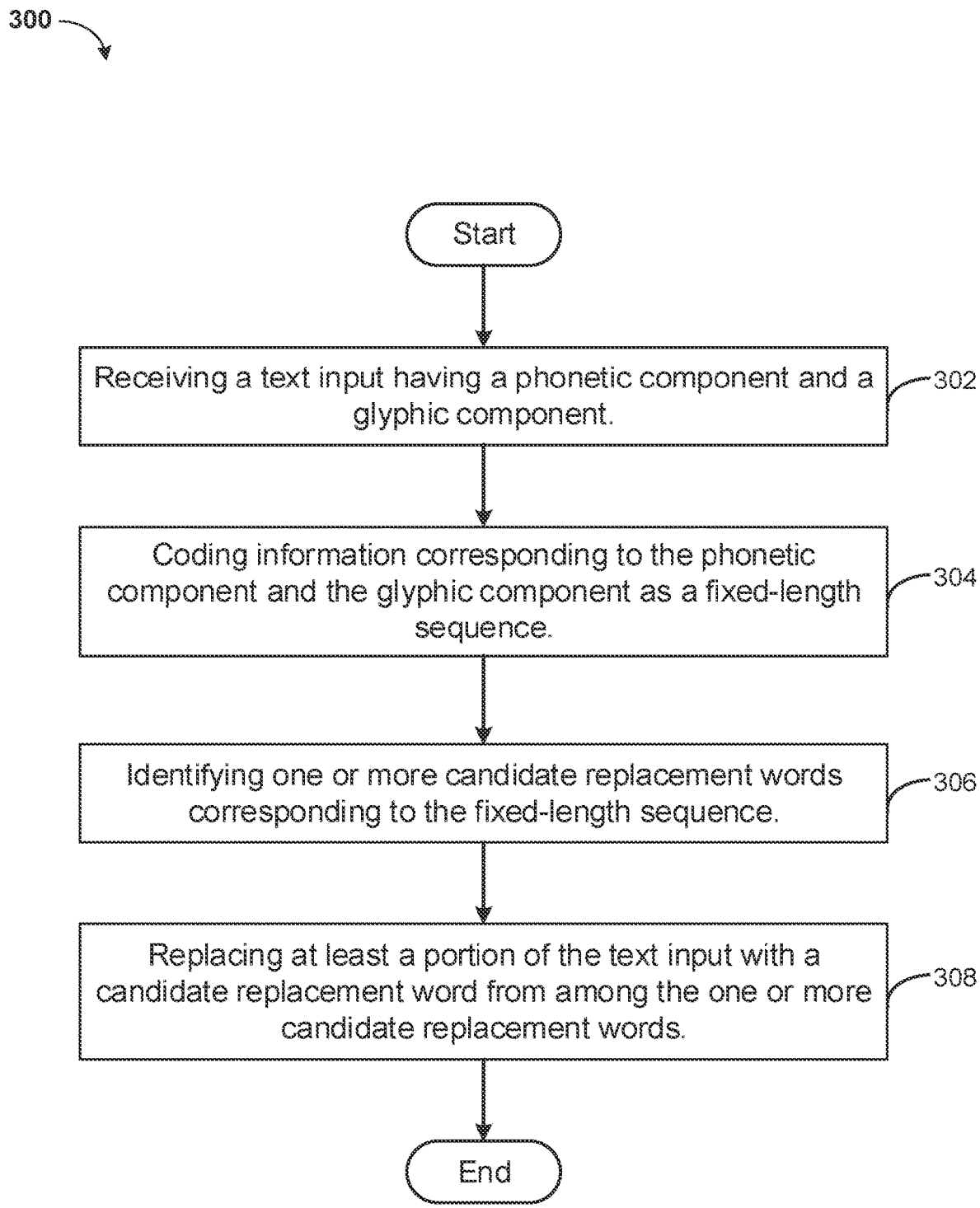
FIG. 3 is an operational flowchart illustrating the steps carried out by a program that identifies and corrects text errors in natural language processing, according to at least one embodiment.

Referring now to FIG. 3, an operational flowchart illustrating the steps of a method 300 carried out by a program that identifies and correct text errors in natural language processing is depicted.

At 302, the method 300 may include receiving a text input having a phonetic component and a glyphic component.

At 304, the method 300 may include coding information corresponding to the phonetic component and the glyphic component as a fixed-length sequence.

At 306, the method 300 may include identifying one or more candidate replacement words corresponding to the fixed-length sequence.

At 308, the method 300 may include replacing at least a portion of the text input with a candidate replacement word from among the one or more candidate replacement words.

It may be appreciated that FIG. 3 provides only an illustration of one implementation and does not imply any limitations with regard to how different embodiments may be implemented. Many modifications to the depicted environments may be made based on design and implementation requirements.

Figure 4:
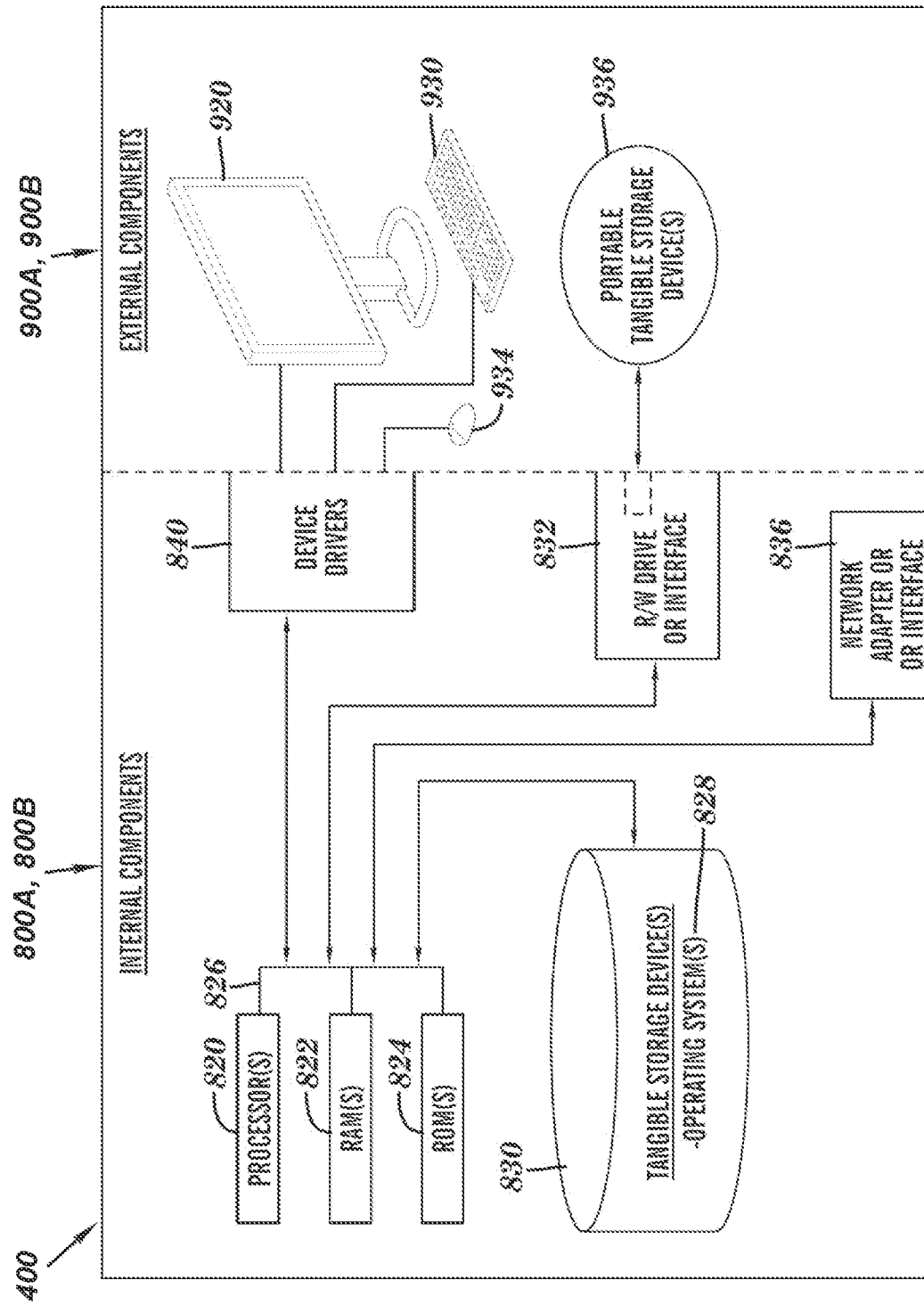
FIG. 4 is a block diagram of internal and external components of computers and servers depicted in FIG. 1 according to at least one embodiment.

FIG. 4 is a block diagram 400 of internal and external components of computers depicted in FIG. 1 in accordance with an illustrative embodiment. It should be appreciated that FIG. 4 provides only an illustration of one implementation and does not imply any limitations with regard to the environments in which different embodiments may be implemented. Many modifications to the depicted environments may be made based on design and implementation requirements.

Figure 5:
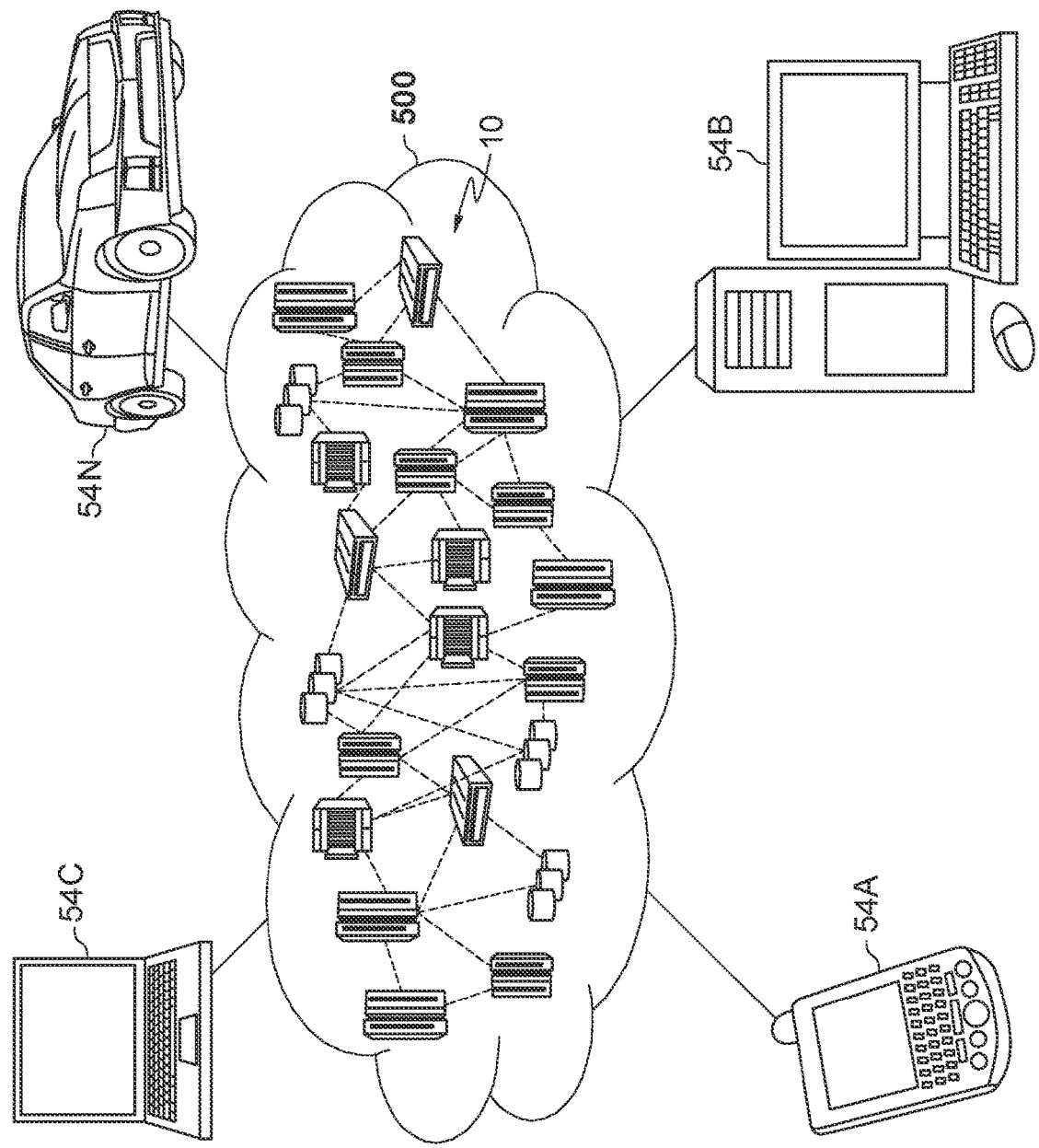
FIG. 5 is a block diagram of an illustrative cloud computing environment including the computer system depicted in FIG. 1, according to at least one embodiment.

Computer 102 (FIG. 1) and server computer 114 (FIG. 1) may include respective sets of internal components 800A,B and external components 900A,B illustrated in FIG. 5. Each of the sets of internal components 800 include one or more processors 820, one or more computer-readable RAMs 822 and one or more computer-readable ROMs 824 on one or more buses 826, one or more operating systems 828, and one or more computer-readable tangible storage devices 830.

Processor 820 is implemented in hardware, firmware, or a combination of hardware and software. Processor 820 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. Bus 826 includes a component that permits communication among the internal components 800A,B.

The one or more operating systems 828, the software program 108 (FIG. 1) and the Text Error Correction Program 116 (FIG. 1) on server computer 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory, an optical disk, a magneto-optic disk, a solid state disk, a compact disc (CD), a digital versatile disc (DVD), a floppy disk, a cartridge, a magnetic tape, and/or another type of non-transitory computer-readable tangible storage device that can store a computer program and digital information.

Each set of internal components 800A,B also includes a R/W drive or interface 832 to read from and write to one or more portable computer-readable tangible storage devices 936 such as a CD-ROM, DVD, memory card, USB flash drive, magnetic tape, magnetic disk, optical disk or semiconductor storage device. A software program, such as the software program 108 (FIG. 1) and the Text Error Correction Program 116 (FIG. 1) can be stored on one or more of the respective portable computer-readable tangible storage devices 936, read via the respective R/W drive or interface 832 and loaded into the respective hard drive 830.

Each set of internal components 800A,B also includes network adapters or interfaces 836 such as a TCP/IP adapter cards; wireless interface cards based on IEEE 802.11 family of standards; or 3G, 4G, or 5G wireless interface cards or other wired or wireless communication links. The software program 108 (FIG. 1) and the Text Error Correction Program 116 (FIG. 1) on the server computer 114 (FIG. 1) can be downloaded to the computer 102 (FIG. 1) and server computer 114 from an external computer via a network (for example, the Internet, a local area network or other, wide area network) and respective network adapters or interfaces 836. From the network adapters or interfaces 836, the software program 108 and the Text Error Correction Program 116 on the server computer 114 are loaded into the respective hard drive 830. The network may comprise copper wires, optical fibers, wireless transmission, routers, firewalls, switches, gateway computers and/or edge servers.

Each of the sets of external components 900A,B can include a computer display monitor 920, a keyboard 930, and a computer mouse 934. External components 900A,B can also include touch screens, virtual keyboards, touch pads, pointing devices, and other human interface devices. Each of the sets of internal components 800A,B also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, some embodiments are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring to FIG. 5, illustrative cloud computing environment 500 is depicted. As shown, cloud computing environment 500 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 54A-N shown in FIG. 5 are intended to be illustrative only and that cloud computing nodes 10 and cloud computing environment 500 can communicate with any type of computerized device over any type of network and/or network addressable connection (e.g., using a web browser).

Figure 6:
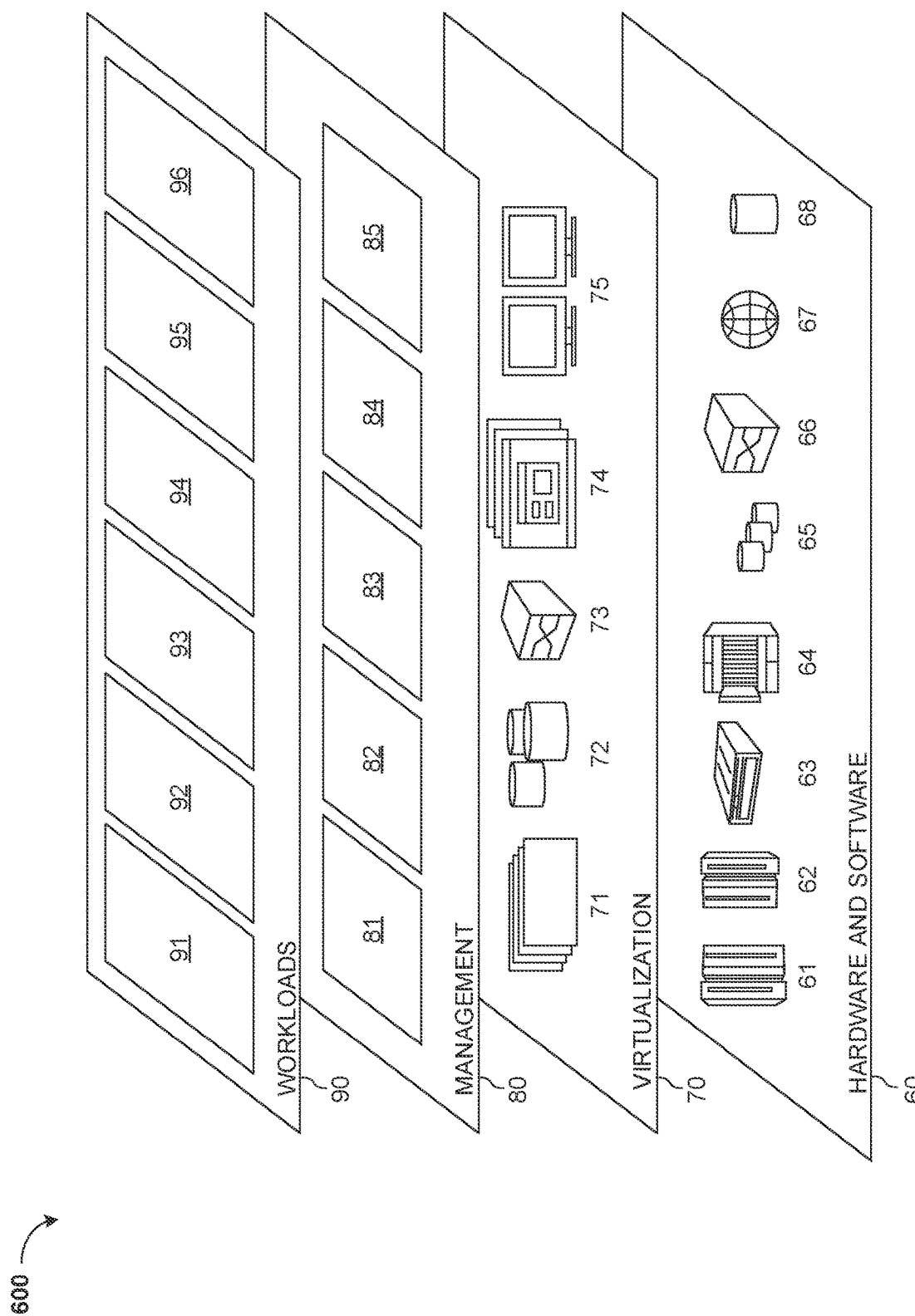
FIG. 6 is a block diagram of functional layers of the illustrative cloud computing environment of FIG. 5, according to at least one embodiment.

Referring to FIG. 6, a set of functional abstraction layers 600 provided by cloud computing environment 500 (FIG. 5) is shown. It should be understood in advance that the components, layers, and functions shown in FIG. 6 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Text Error Correction 96. Text Error Correction 96 may identify and correct text errors for natural language processing.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory card, a USB flash drive, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of text error identification and correction, executable by a processor, the method comprising:
   receiving a text input having a phonetic component and a glyphic component;
   coding a fixed-length sequence comprising a plurality of positions, a first portion of the plurality of positions corresponding to the phonetic component and a second portion of the plurality of positions corresponding to the glyphic component of the received text;
   wherein the plurality of positions corresponding to the phonetic component comprises:
   first, second, and third positions corresponding to initial, final, and auxiliary final components corresponding to a character associated with the text input;
   a fourth position corresponding to a tone component corresponding to the character associated with the text input;
   wherein the plurality of positions corresponding to the glyphic component comprises:
   fifth, sixth, seventh, eighth, and ninth positions corresponding to a five-digit Four-Corner code corresponding to the character associated with the text input;
   a tenth position corresponding to a structure corresponding to the character associated with the text input;
   an eleventh position corresponding to a number of strokes corresponding to the character associated with the text input;
   identifying a plurality of candidate replacement words according to a calculated similarity between the fixed-length sequence of the received text and a fixed length sequence of each of the plurality of candidate replacement words, where each of the plurality of positions of the fixed-length sequence are individually weighted by a respective weighting function;
   ranking the plurality of candidate replacement words, based on the calculated similarity; and
   outputting a correction text comprising a candidate replacement word having a highest ranking among the plurality of candidate replacement words.

2. The method of claim 1, further comprising replacing at least a portion of the text input with the correction text.

3. The method of claim 1, wherein at least a portion of the plurality of candidate replacement words correspond to a domain-specific application associated with the text input.

4. The method of claim 1, wherein the text input comprises one or more from among traditional Chinese characters, simplified Chinese characters, and Pinyin input.

5. The method of claim 1, wherein the calculated similarity is calculated as:

$$s(C_1, C_2) = \sum_{i=0}^{5} w_{gi} f(g_{1i} + g_{2i}) + w_{g6} h(g_{16}, g_{26}) + \sum_{i=0}^{3} w_{pi} f(P_{1i}, P_{2i})$$

where $C_x$ denotes the character, $s(C_1,C_2)$ denotes a similarity between two characters $C_1$ and $C_2$, $g_x$ denotes a set of the glyphic components of the fixed-length sequence, $p_x$ denotes a set of the phonetic components of the fixed-length sequence, w denotes a set of tunable weighting variables, f(a,b) denotes a binary measurement function for two codes a and b, and h(a,b) denotes a continuous measurement function for the two codes a and b.

6. A computer system for text error identification and correction, the computer system comprising:
one or more computer-readable non-transitory storage media configured to store computer program code; and
one or more computer processors configured to access said computer program code and operate as instructed by said computer program code, said computer program code including:
receiving code configured to cause the one or more computer processors to receive a text input having a phonetic component and a glyphic component;
coding code configured to cause the one or more computer processors to code a fixed-length sequence comprising a plurality of positions, a first portion of the plurality of positions corresponding to the phonetic component and a second portion of the plurality of positions corresponding to the glyphic component of the received text;
wherein the plurality of positions corresponding to the phonetic component comprises:
first, second, and third positions corresponding to initial, final, and auxiliary final components corresponding to a character associated with the text input;
a fourth position corresponding to a tone component corresponding to the character associated with the text input;
wherein the plurality of positions corresponding to the glyphic component comprises:
fifth, sixth, seventh, eighth, and ninth positions corresponding to a five-digit Four-Corner code corresponding to the character associated with the text input;
a tenth position corresponding to a structure corresponding to the character associated with the text input;
an eleventh position corresponding to a number of strokes corresponding to the character associated with the text input;
identifying code configured to cause the one or more computer processors to identify a plurality of candidate replacement words according to a calculated similarity between the fixed-length sequence of the received text and a fixed length sequence of each of the plurality of candidate replacement words, where each of the plurality of positions of the fixed-length sequence are individually weighted by a respective weighting function;
ranking code configured to cause the one or more computer processors to rank the plurality of candidate replacement words, based on the calculated similarity; and
outputting code configured to cause the one or more computer processors to output a correction text comprising a candidate replacement word having a highest ranking among the plurality of candidate replacement words.

7. The computer system of claim 6, further comprising replacing code configured to cause the one or more computer processors to replace at least a portion of the text input with the correction text.

8. The computer system of claim 6, wherein at least a portion of the plurality of candidate replacement words correspond to a domain-specific application associated with the text input.

9. The computer system of claim 6, wherein the text input comprises one or more from among traditional Chinese characters, simplified Chinese characters, and Pinyin input.

10. The computer system of claim 6, wherein the calculated similarity is calculated as:

$$s(C_1, C_2) = \sum_{i=0}^{5} w_{gi} f(g_{1i} + g_{2i}) + w_{g6} h(g_{16}, g_{26}) + \sum_{i=0}^{3} w_{pi} f(P_{1i}, P_{2i})$$

where $C_x$ denotes the character, $s(C_1,C_2)$ denotes a similarity between two characters $C_1$ and $C_2$, $g_x$ denotes a set of the glyphic components of the fixed-length sequence, $p_x$ denotes a set of the phonetic components of the fixed-length sequence, w denotes a set of tunable weighting variables, f(a,b) denotes a binary measurement function for two codes a and b, and h(a,b) denotes a continuous measurement function for the two codes a and b.

11. A non-transitory computer readable medium having stored thereon a computer program for text error identification and correction, the computer program configured to cause one or more computer processors to:
receive a text input having a phonetic component and a glyphic component;
code a fixed-length sequence comprising a plurality of positions, a first portion of the plurality of positions corresponding to the phonetic component and a second portion of the plurality of positions corresponding to the glyphic component of the received text;
wherein the plurality of positions corresponding to the phonetic component comprises:
first, second, and third positions corresponding to initial, final, and auxiliary final components corresponding to a character associated with the text input;
a fourth position corresponding to a tone component corresponding to the character associated with the text input;
wherein the plurality of positions corresponding to the glyphic component comprises:
fifth, sixth, seventh, eighth, and ninth positions corresponding to a five-digit Four-Corner code corresponding to the character associated with the text input;
a tenth position corresponding to a structure corresponding to the character associated with the text input;
an eleventh position corresponding to a number of strokes corresponding to the character associated with the text input;
identify a plurality of candidate replacement words according to a calculated similarity between the fixed-length sequence of the received text and a fixed length sequence of each of the plurality of candidate replacement words, where each of the plurality of positions of the fixed-length sequence are individually weighted by a respective weighting function;
rank the plurality of candidate replacement words, based on the calculated similarity; and
output a correction text comprising a candidate replacement word having a highest ranking among the plurality of candidate replacement words.

12. The non-transitory computer readable medium of claim 11, wherein the computer program is further configured to cause the one or more computer processors to replace at least a portion of the text input with the correction text.

13. The non-transitory computer readable medium of claim 11, wherein the plurality of candidate replacement words correspond to a domain-specific application associated with the text input.

14. The non-transitory computer readable medium of claim 11, wherein the calculated similarity is calculated as:

$$s(C_1, C_2) = \sum_{i=0}^{5} w_{gi} f(g_{1i} + g_{2i}) + w_{g6} h(g_{16}, g_{26}) + \sum_{i=0}^{3} w_{pi} f(P_{1i}, P_{2i})$$

where $C_x$ denotes the character, $s(C_1,C_2)$ denotes a similarity between two characters $C_i$ and $C_2$, $g_x$ denotes a set of the glyphic components of the fixed-length sequence, $p_x$ denotes a set of the phonetic components of the fixed-length sequence, w denotes a set of tunable weighting variables, f(a,b) denotes a binary measurement function for two codes a and b, and h(a,b) denotes a continuous measurement function for the two codes a and b.

* * * * *